(12) United States Patent
Hall

(10) Patent No.: US 9,617,078 B2
(45) Date of Patent: Apr. 11, 2017

(54) CONVEYOR FRAME ASSEMBLY WITH CROSS SUPPORTS

(71) Applicant: Dorner Mfg. Corp., Hartland, WI (US)

(72) Inventor: Scott M. Hall, Sussex, WI (US)

(73) Assignee: Dorner Mfg. Corp., Hartland, WI (US)

( * ) Notice: Subject to any disclaimer, the term of this patent is extended or adjusted under 35 U.S.C. 154(b) by 0 days.

(21) Appl. No.: 14/210,808

(22) Filed: Mar. 14, 2014

(65) Prior Publication Data
US 2015/0259148 A1 Sep. 17, 2015

(51) Int. Cl.
*B65G 21/02* (2006.01)
*B65G 21/06* (2006.01)

(52) U.S. Cl.
CPC ............. *B65G 21/02* (2013.01); *B65G 21/06* (2013.01)

(58) Field of Classification Search
CPC ................................ B65G 21/06; B65G 21/02
See application file for complete search history.

(56) References Cited

U.S. PATENT DOCUMENTS

| | | | | |
|---|---|---|---|---|
| 3,878,935 A * | 4/1975 | Oury ...................... | B65G 21/14 198/311 |
| 4,511,024 A * | 4/1985 | Long .................... | A47B 83/001 198/346 |
| 4,982,835 A * | 1/1991 | Butler ................ | B65G 21/2072 198/836.3 |
| 5,078,250 A * | 1/1992 | Cole ...................... | B65G 21/00 193/35 R |
| 5,797,481 A * | 8/1998 | Uber ...................... | B65G 23/44 198/813 |
| 6,422,382 B1 * | 7/2002 | Ertel ...................... | B65G 21/02 198/841 |
| 6,533,108 B1 * | 3/2003 | Ledingham ............ | B65G 21/22 198/841 |
| 6,854,397 B2 * | 2/2005 | Terajima ................ | B65G 21/06 104/95 |
| 7,246,697 B2 * | 7/2007 | Hosch .................... | B65G 21/06 198/831 |
| 7,484,715 B2 * | 2/2009 | Hoffend, Jr. ............... | A63J 1/02 212/98 |
| 7,735,638 B2 * | 6/2010 | Hau ........................ | B65G 21/02 198/860.1 |
| 8,403,280 B2 * | 3/2013 | Halverson et al. ...... | 248/229.22 |
| 8,998,160 B1 * | 4/2015 | Vanwey ................ | B65G 21/02 248/354.5 |

(Continued)

*Primary Examiner* — Thomas Randazzo
(74) *Attorney, Agent, or Firm* — Andus Intellectual Property Law, LLP

(57) ABSTRACT

The present disclosure relates to a conveyor frame assembly that includes a pair of spaced side rails joined by one or more cross supports. Each of the cross supports includes an attachment clamp such that the first and second ends of the cross support can be securely attached to an inner surface of the side rails. The attachment clamp includes a pair of attachment jaws that are joined to each other by an adjustment member. Rotation of the adjustment member causes the attachment jaws to move toward each other. As the attachment jaws move toward each other, an engagement surface formed on each of the attachment jaws causes the side rails and cross support to move toward each other to securely attach the cross support between the side rails to allow for easy and convenient construction and field modification of the conveyor frame assembly.

19 Claims, 8 Drawing Sheets

(56) References Cited

U.S. PATENT DOCUMENTS

2006/0013648 A1* 1/2006 Bernstein ................. B25B 1/24
                                                    403/374.4
2006/0070859 A1* 4/2006 Pahlow .................. B65G 15/10
                                                    198/809

* cited by examiner

CONVEYOR FRAME ASSEMBLY WITH CROSS SUPPORTS

BACKGROUND

The present disclosure generally relates to modular conveyor frame assemblies. More specifically, the present disclosure relates to a conveyor frame assembly that includes configurable cross supports that can be securely positioned at desired locations along the length of spaced side rails utilizing attachment clamps mounted within the cross supports.

In many applications of conveyor systems, the user of the conveyor assembly desires to change the length of the conveyor frame based upon the needs of the current application. Typically, the length of the conveyor assembly is adjusted by removing portions of the side rail and shortening the conveyor belt. During this process, the cross supports that provide rigidity to the conveyor frame are typically moved and reinstalled at the desired location along the modified length of the conveyor frame. In many conveyor frame assemblies, the reattachment of the cross support requires personnel to add holes to the conveyor side frame, which is oftentimes not practical in the operating environment.

Therefore, a need exists for a conveyor frame assembly that includes side rails and cross supports that allow the conveyor length to be modified without requiring holes to be added to the conveyor side rails and without requiring complete disassembly.

SUMMARY

The present disclosure relates to a conveyor frame assembly that can be assembled without any modification to the side rails of the conveyor frame assembly. The conveyor frame assembly includes a pair of spaced side rails and a plurality of cross supports that are selectively positionable along the length of the side rails.

Each of the side rails of the modular conveyor assembly includes a pair of attachment lips. In one embodiment of the disclosure, the attachment lips form part of a pair of spaced attachment cavities. In an alternate embodiment, each of the attachment lips is positioned along the interior side of the side rail.

The modular conveyor assembly includes a plurality of cross supports that can each be selectively positioned along the length of the side rails. The cross supports each include a first end connected to one of the side rails and a second end that is connected to an opposite side rail. When the cross supports are connected between the pair of spaced side rails, the cross supports provide strength and rigidity for the conveyor frame assembly.

Each of the cross supports includes an attachment clamp located at both the first end and the second end of the cross support. The attachments clamp securely connect the respective end of the cross support to the side rail while being releasable to allow the cross support to slide along the length of the side rails. The attachment clamps contained on each end of the cross supports include a pair of attachment jaws that are vertically spaced from each other. The attachment jaws each include an engagement end that includes an angled engagement surface that contacts and engages one of the attachment lips formed on the side rail to which the cross support is attached.

The attachment jaws are each coupled to an adjustment member that is operable to adjust the distance between the pair of attachment jaws. When the adjustment member is moved in a first direction, the attachment jaws are moved toward each other. The movement of the attachment jaws toward each other causes the angled engagement surface to move the cross support and side rail into contact with each other to create a secure attachment. Movement of the adjustment member in a second, opposite direction separates the attachment jaws, thereby releasing the cross support and allowing the cross support to slide along the length of the side rails.

Various other features, objects and advantages of the invention will be made apparent from the following description taken together with the drawings.

BRIEF DESCRIPTION OF THE DRAWINGS

The drawings illustrate the best mode presently contemplated of carrying out disclosure. In the drawings.

DETAILED DESCRIPTION

Figure 1:
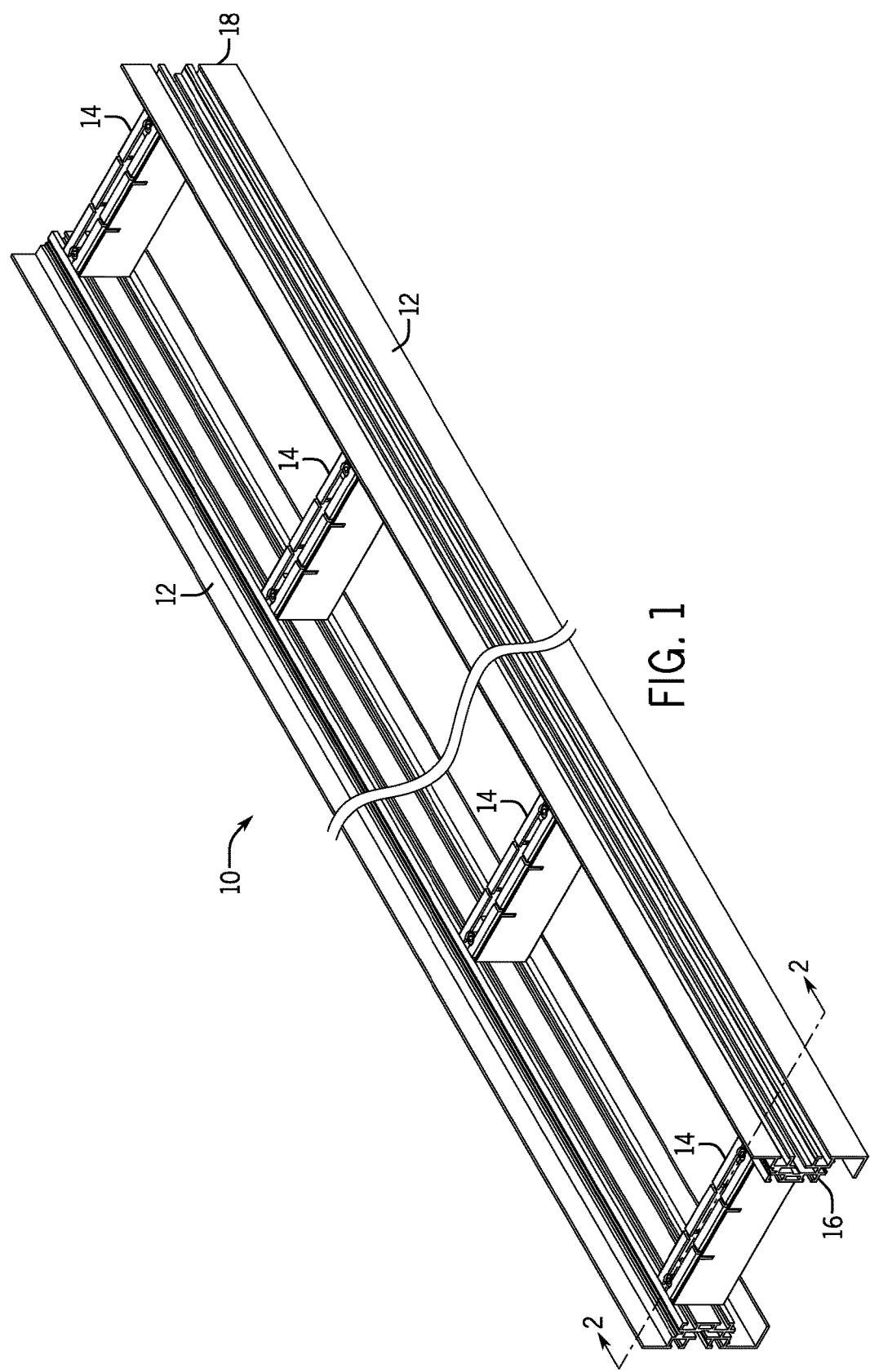
FIG. 1 is a perspective view illustrating as conveyor frame assembly constructed in accordance with the present disclosure.

FIG. 1 illustrates a conveyor frame assembly 10 constructed in accordance with the present disclosure. The conveyor frame assembly 10 generally includes a pair of side rails 12 spaced from each other by the width of the conveyor belt (not shown) to be utilized with the conveyor frame assembly 10. The pair of side rails 12 are supported in a spaced relationship by a series of spaced cross supports 14. Although the conveyor frame assembly 10 shown in FIG. 1 includes four spaced cross supports 14, it should be understood that additional cross supports 14 could be utilized in a conveyor frame assembly having a significantly greater length. Likewise, if the conveyor frame assembly 10 has a significantly shorter length, fewer cross supports 14 could be utilized while operating within the scope of the present disclosure. The cross supports 14 provide structural integrity for the conveyor frame assembly 10 and, as such, additional cross supports 14 may be needed for longer lengths of the conveyor frame assembly 10.

In the embodiment illustrated in FIG. 1, both the side rails 12 and the cross supports 14 are formed from extruded aluminum, although other materials are contemplated as being within the scope of the present disclosure. In accordance with the present disclosure, the location of the cross supports 14 along the length of the side rails 12 between a first end 16 and a second end 18 can be adjusted.

Figure 2:
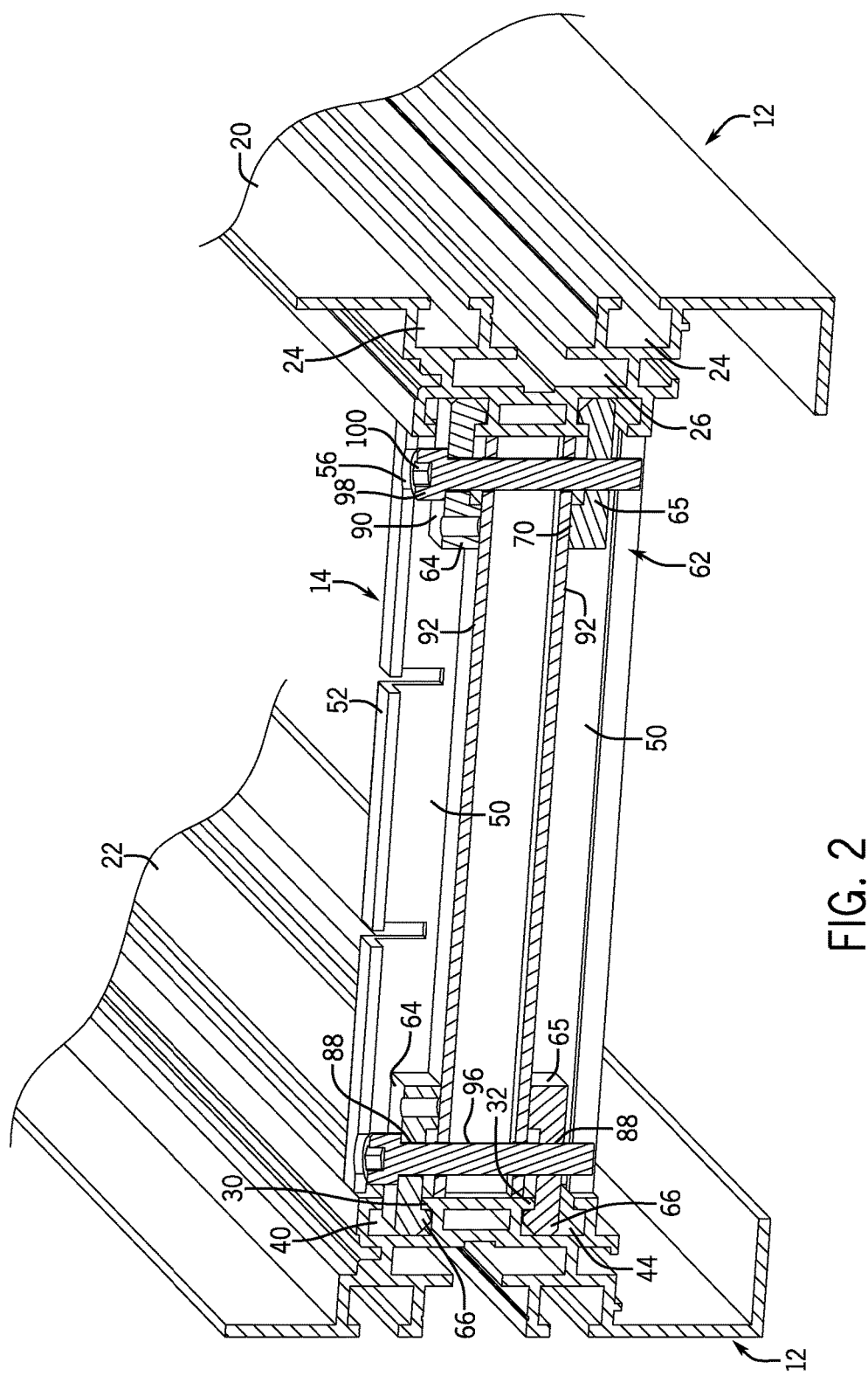
FIG. 2 is a section view taken along line 2-2 of FIG. 1.

Referring now to FIG. 2, each of the side rails 12 includes an exterior side 20 and an interior side 22. The interior sides 22 of each of the pair of spaced side rails 12 face each other and define a width of the conveyor frame between the pair of spaced side rails 12. Each of the cross supports 14 extends across the width between the side rails 12 and acts to provide strength and rigidity for the assembled conveyor frame.

The aluminum extrusion that forms each of the side rails 12 includes a pair of external channels 24 that extend along the entire length of each of the side rails 12. The channels 24 allow for the attachment of various accessories to the side rail 12 through a conventional T-slot connector. In addition to the channels 24, each of the side rails 12 also includes a center channel 26 that can receive other types of mounting connectors to secure devices along the length of the conveyor frame.

Figure 3:
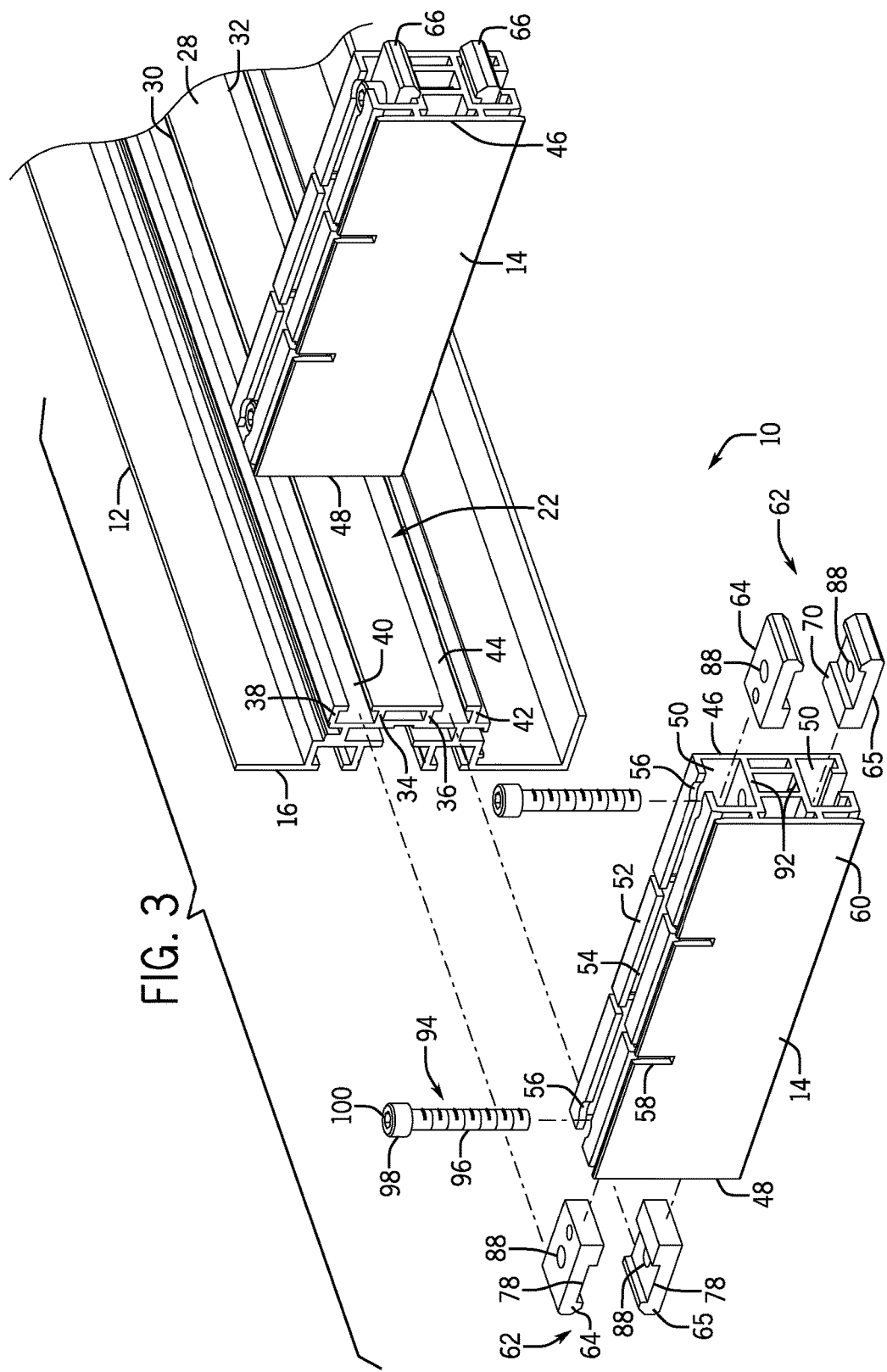
FIG. 3 is an exploded, perspective view showing the configuration of the side rail and the components of the cross support.

Referring now to FIG. 3, the interior side 22 of the side rail 12 includes a flat contact surface 28 that is defined at an upper end by a first attachment lip 30 and at a lower end by a second attachment lip 32. The first attachment lip 30 extends vertically above the horizontal wall 34 while the second attachment lip 32 extends below the horizontal wall 36. The horizontal wall 34, along with a spaced horizontal wall 38 defines an upper attachment slot 40. The horizontal wall 36 combines with the horizontal walls 42 to define a lower attachment slot 44. The attachment slots 40, 44 each extend along the entire length of the side rail 12 and are open at both the first end 16 and the second end 18.

As discussed above, the conveyor frame assembly 10 further includes the series of cross supports 14. As illustrated in FIG. 3, each of the cross supports 14 has a length that extends from a first end 46 to a second end 48. The cross support 14 includes a pair of receiving cavities 50 that are spaced from each other within the cross support 14. Each of the receiving cavities 50 extend along the length of the cross support 14 from the first end 46 to the second end 48. The cross support 14 includes a first surface 52 that includes an open center slot 54. In the embodiment shown, the first surface 52 is positioned upward, although it is contemplated that the orientation of the cross support 14 could be inverted depending on the application of the conveyor frame assembly 10. The open center slot 54 includes a pair of access openings 56. In the embodiment shown in FIG. 3, the surface 52 also includes a series of longitudinal slots 58 that also extend into an outer wall 60. The longitudinal slots 58 allow for the insertion of additional longitudinal supports (not shown) that extend between the spaced cross supports 14 to support the upper run of the conveyor belt.

As illustrated in FIG. 3, each of the cross supports 14 includes an attachment clamp 62 that extends from one of its first or second ends 46, 48. The attachment clamps 62 allow the cross support 14 to be securely connected between the interior sides 22 of the spaced side rails 12. In the embodiment shown in FIG. 3, the cross support 14 is shown having the second end 48 securely connected to the side rail 12 such that the second end 48 is in physical contact with the contact surface 28. The opposite, first end 46 is connected to the opposite side rail (not shown) such that the cross support 14 is positioned as shown in FIG. 2.

Referring back to FIG. 3, each of the attachment clamps 62 includes a pair of attachment jaws 64 and 65. The attachment jaws 64, 65 are each positioned within one of the receiving cavities 50 such that an engagement end 66 of each of the jaws 64, 65 extends past the outermost end of the cross support 14.

Figure 7:
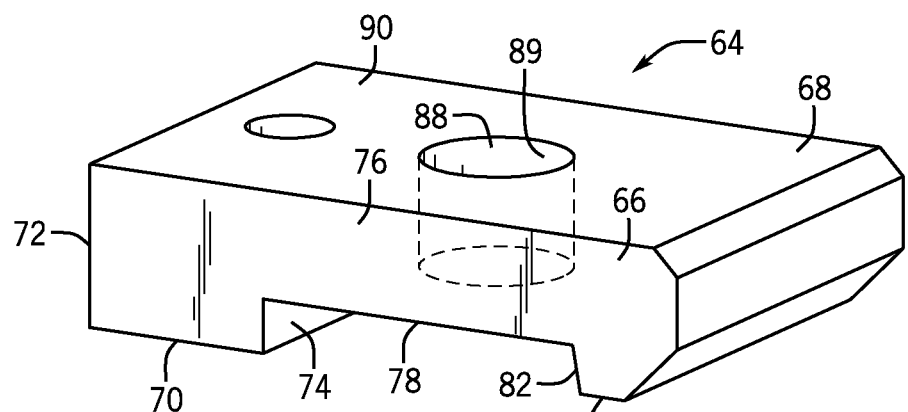
FIG. 7 is a perspective view of one of the attachment jaws.
Figure 8:
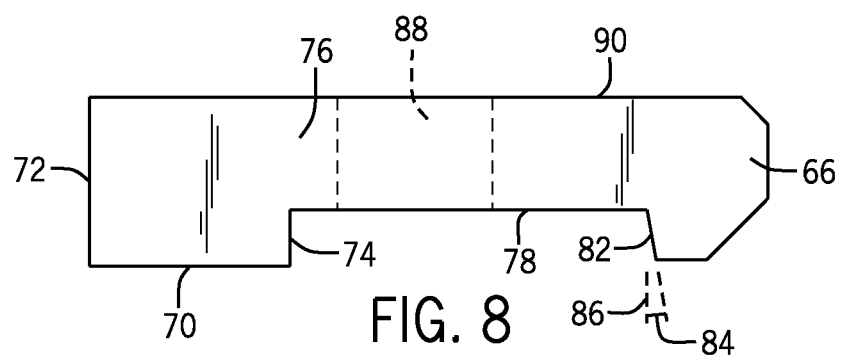
FIG. 8 is a side view of the attachment jaw shown in FIG. 7.
Figure 9:
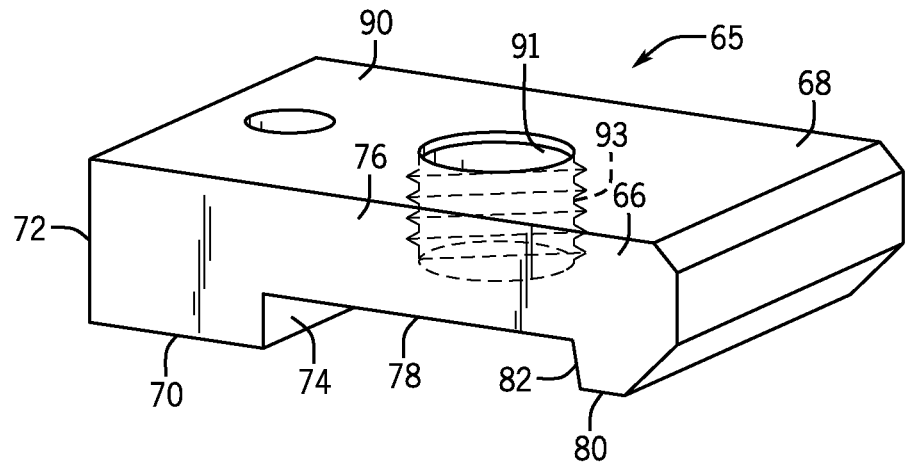
FIG. 9 is a perspective view of a second attachment jaw.

Referring now to FIGS. 7-9, each of the attachment jaws 64, 65 includes a main body 68. The main body 68 defines an inner face support surface 70 that extends from an inner end 72. The support surface 70 terminates at shoulder 74. The shoulder 74 defines the transition between the support surface 70 and the intermediate portion 76. The intermediate portion 76 of the main body 68 is defined by the inner surface 78 that is recessed from the support surface 70 by the shoulder 74.

As previously described, the attachment jaws 64, 65 each include an engagement end 66. The engagement end 66 includes the inner surface 80. The transition between the inner surface 78 of the intermediate portion 76 and the inner surface 80 of the engagement end 66 is defined by an angled engagement surface 82. As best shown in FIG. 8, the engagement surface 82 extends at an angle 84 relative to a vertical axis 86. The angle 84 of the engagement surface 82 helps to create movement between the side rail 12 and the cross support, as will be described in much greater detail below. In the embodiment shown, the angle 84 is 10°, although other angles are contemplated.

Referring back to FIG. 7, the upper attachment jaw 64 includes an attachment opening 88 that extends through the entire thickness of the attachment jaw 64 from the outer surface 90 to the inner surface 78 of the intermediate portion 76. In the embodiment illustrated, the attachment opening 88 is a through hole having a smooth inner surface 89.

The second attachment jaw 65 shown in FIG. 9 has a similar profile to the attachment jaw 64 and includes a similar attachment opening 88. However, inner surface 91 of the attachment opening 88 of the attachment jaw 65 includes a series of internal threads 93 having a defined pitch extending from the outer surface 90 to the inner surface 78.

As illustrated in FIG. 3, when the pair of attachment jaws 64, 65 are installed within the cross support 14, the inner surfaces 78 of the jaws are positioned to face each other. When the attachment jaws 64, 65 are positioned within the receiving cavities 50, the support surface 70 on each of the jaws 64, 65 contacts one of the horizontal support walls 92. The interaction between the support surface 70 and the support wall 92 can clearly be seen in FIG. 2. The interaction between the support wall 92 and the support surface 70 limits the vertical movement of the attachment jaws 64, 65 toward each other.

Each of the attachment clamps 62 shown in FIG. 3 further includes an adjustment member 94. The adjustment member 94 passes through the attachment opening 88 of the attachment jaw 64 and is received by the threads formed along the attachment opening 88 of the lower attachment jaw 65 such that the adjustment member 94 can be used to modify the distance between the pair of adjustment jaws 64, 65. In the embodiment shown in FIG. 3, the adjustment member 94 includes an externally threaded shaft 96 that extends from a head 98 including a cavity 100 that can receive an adjustment tool (not shown). As can be understood in FIG. 2, the threaded shaft 96 is received within the attachment opening 88 formed in the adjustment jaw 65 and passes through the attachment opening 88 in the attachment jaw 64. When the adjustment member is coupled to the pair of spaced attachment jaws 64, 65, the head 98 contacts the outer surface 90 of the attachment jaw 64 and is accessible through the access opening 56 formed in the surface 52. In this manner, a user can access the cavity 100 formed in the head 98 with the required tool to rotate the adjustment member and thus modify the spacing between the pair of attachment jaws 64, 65.

As can be understood by the above description, when the attachment clamp 62 is assembled as shown in FIG. 2, when the head 98 and associated threaded shaft 96 are rotated in a clockwise direction when viewed from above, the distance between the two attachment jaws 64, 65 decreases. Likewise, when the head 98 and associated shaft 96 are rotated in the opposite, counterclockwise direction, the distance between the pair of attachment jaws 64, 65 increases. Rotation of the head 98 in the clockwise direction thus tightens the attachment between the cross support 14 and the side rail 12 while rotation in the opposite, counterclockwise direction loosens the engagement between these two components.

As illustrated in FIG. 2, the engagement end 66 of each attachment jaw 64, 65 is received within one of the attachment slots 40, 44 such that the engagement end 66 contacts one of the attachment lips 30, 32. In the initial attachment condition, the adjustment member 94 is retracted such that the attachment jaws 64, 65 are loose and moveable within the respective receiving cavity 50. In this condition, the pair of attachment jaws 64, 65 can be slid into the open ends of the attachment slots 40, 44 as illustrated in FIG. 3.

Once the attachment jaws 64, 65 are received within the attachment slots 40, 11, the entire cross support 14 can be slid along the length of the pair of side rails 12 to the desired location, such as shown in FIG. 1. Once the cross support 14 is in the desired location, the user inserts a tool into the cavity 100 formed in the head 98 of the adjustment member 94. Once the tool is inserted, the tool can be rotated, which causes the threaded shaft 96 to rotate and engage the threads formed along the threaded attachment opening 88 formed in the lower attachment jaw 65.

Figure 10:
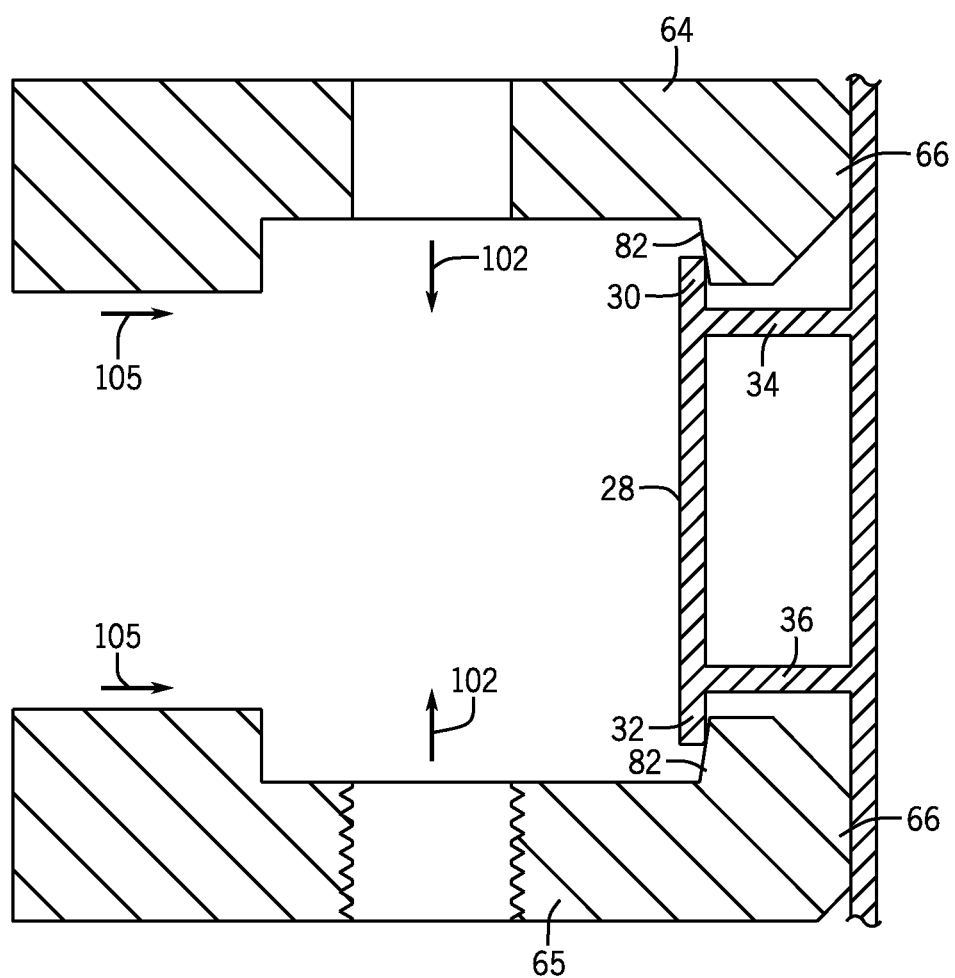
FIG. 10 is a section view showing the movement of the attachment jaws toward each other.

As shown in FIG. 10, when the attachment jaws 64, 65 are initially positioned, the engagement surface 82 formed on the engagement end 66 contacts one of the attachment lips 30, 32. When the adjustment member is rotated to pull the jaws 64, 65 together, the movement of each of the jaws 64, 65 in the direction of arrows 102 causes each of the jaws 64, 65 to also move in the direction shown by arrows 105 due to the interaction between the respective attachment lip 30, 32 and the angled engagement surface 82. Since each of the jaws 64, 65 is contained within one of the ends of the cross support, the movement of the jaws in the direction shown by arrow 105 causes the cross support to move into contact with the side rail. In this manner, the movement of the jaws 64, 65 toward each other, as shown by arrow 102, causes the cross support to move toward the side rail and to be securely attached to one of the side rails. This process is repeated for the opposite side of the side rail.

Figure 4:
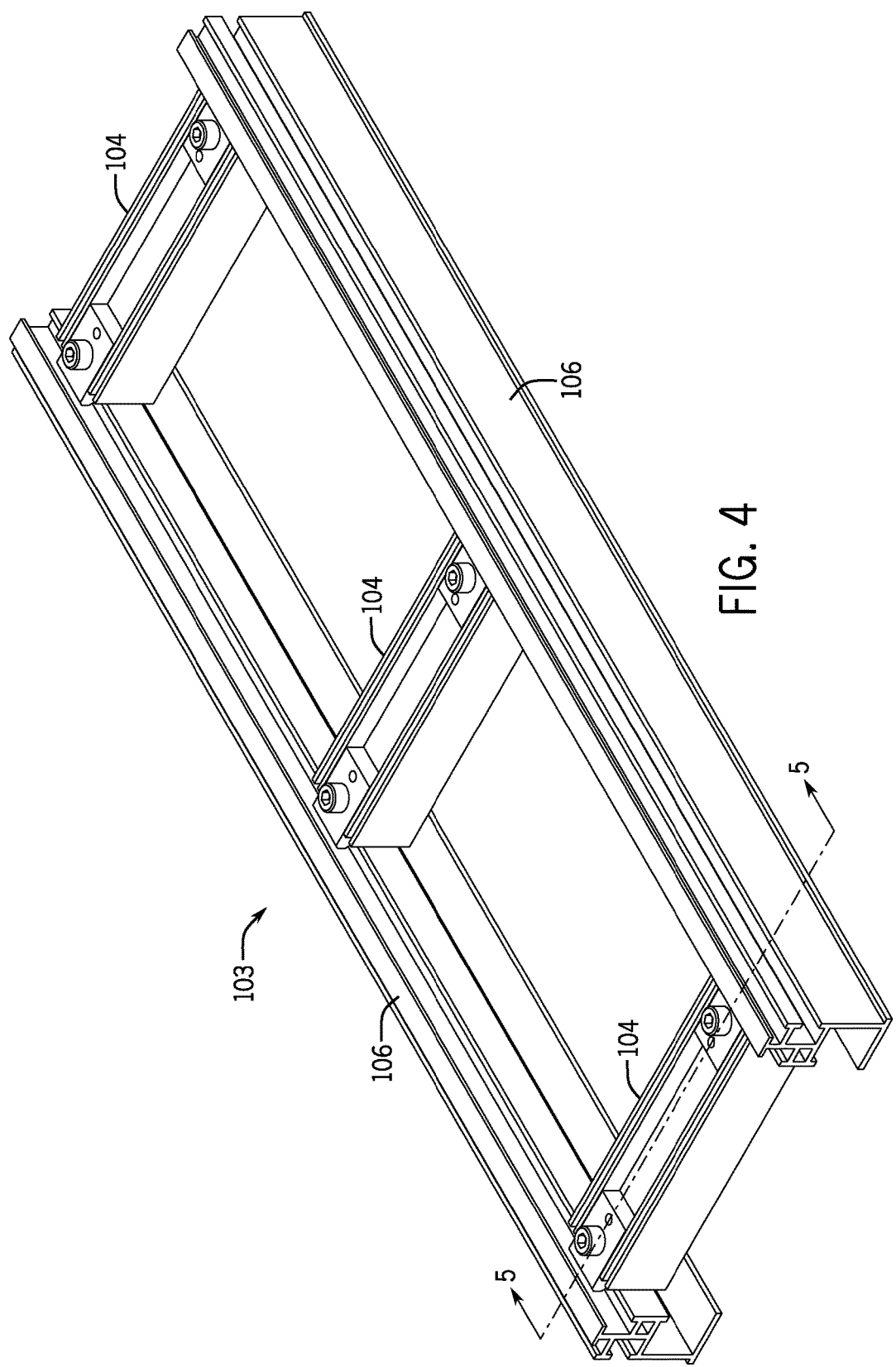
FIG. 4 is a perspective view of a second embodiment of the conveyor frame assembly of the present disclosure.
Figure 5:
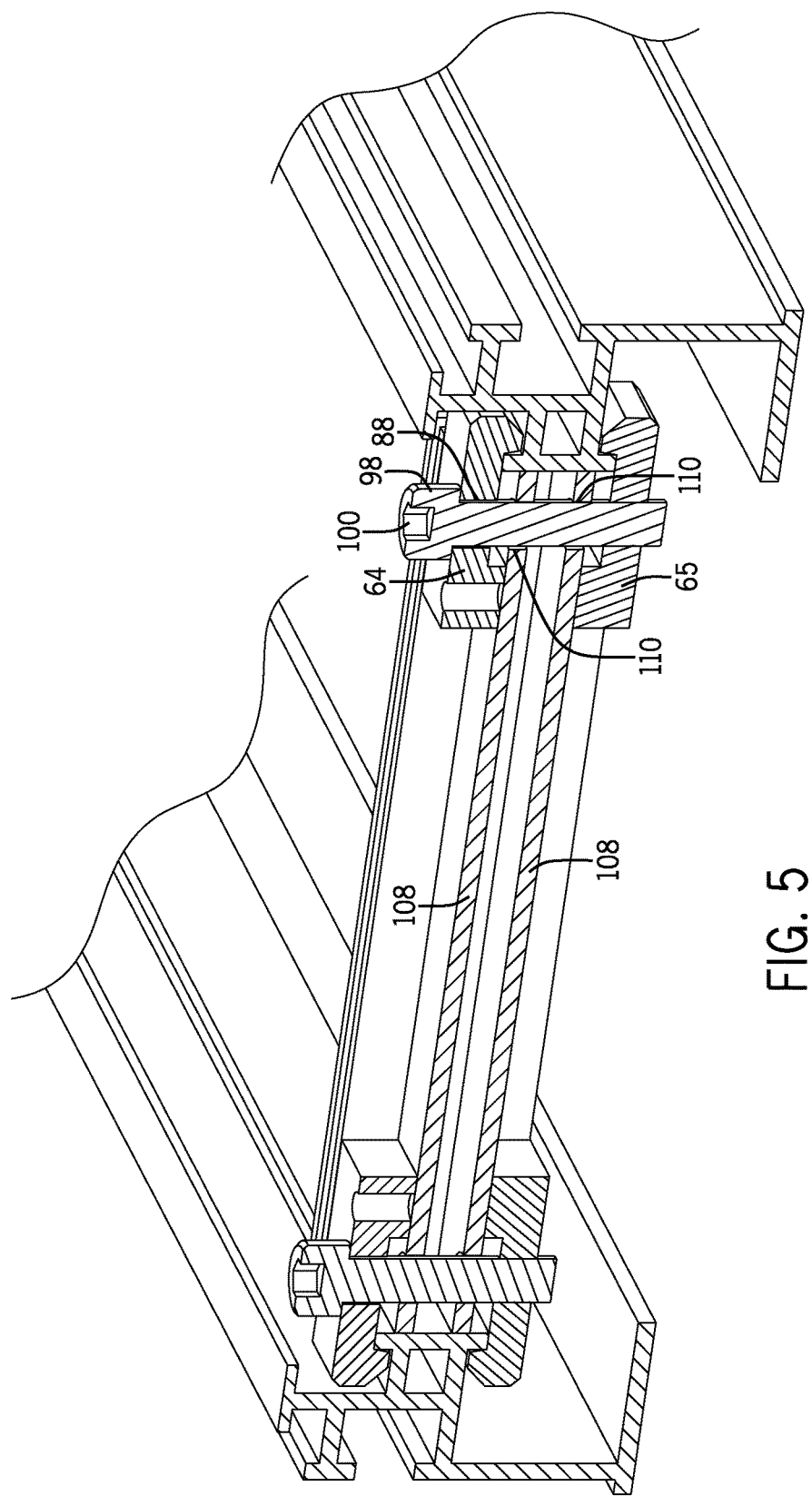
FIG. 5 is a section view taken along line 5-5 of FIG. 4.
Figure 6:
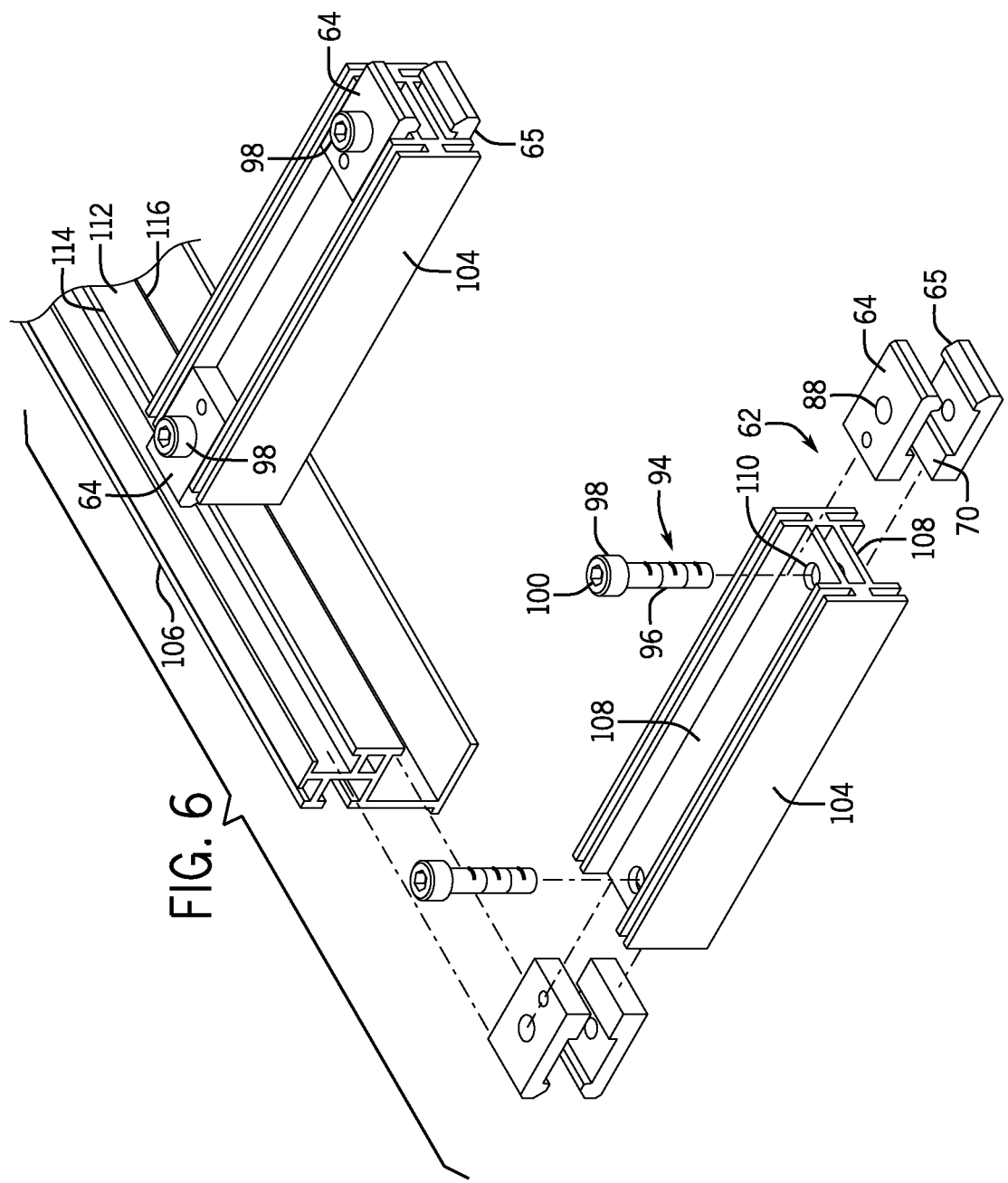
FIG. 6 is an exploded, perspective view of the side frame and cross support of the second embodiment.

FIGS. 4-6 illustrate a second embodiment of a conveyor frame assembly. In the embodiment shown in FIGS. 4-6, the reference numerals of FIGS. 1-3 are utilized for similar parts 103. In the embodiment shown in FIG. 4, a series of cross supports 104 are spaced along the length of the side rails 106. The cross supports 104 and the side rails 106 are both extruded aluminum components that have a different cross-sectional shape as compared to the similar components in the first embodiment of FIGS. 1-3. As illustrated in FIG. 6, each of the cross supports 104 includes a similar attachment clamp 62 that consists of a pair of attachment jaws. 64, 65 and an adjustment member 94 having a threaded shaft 96 and a head 98 including a tool cavity 100.

Unlike the embodiment shown in FIGS. 1-3, the cross support 104 does not include the enclosed receiving cavities. Instead, both the top and bottom of the cross support 104 are open. The cross support 104 includes spaced support walls 108 that each contact and support the support surface 70 thrilled on the attachment jaws 64, 65. The support walls 108 each include an opening 110 that allows the threaded shaft 96 to pass through the pair of spaced support walls 108. As in the first embodiment, rotation of the adjustment member 94 causes the attachment jaws 64, 65 to move toward or away from each other based upon the threaded interaction between the threaded shaft 96 and the threaded attachment openings 88 formed in the attachment jaws 64.

Referring back to FIG. 6, the side rail 106 includes a contact surface 112 that is defined at one end by the first attachment lip 114 and a second attachment lip 116. Unlike the embodiment shown in FIGS. 1-3, the side rail does not include the continuous attachment slots. Instead, the attachment lips 114, 116 are formed as a portion of the side rail that extends outward and is configured to receive the attachment jaws 64, 65. Like the first embodiment described above with reference to FIGS. 1-3, the second embodiment also allows the cross support 104 to be slid along the length of the side rail 106 and securely attached in a desired location based upon the rotation of the threaded shaft 96 within the pair of spaced attachment jaws 64.

As can be understood in the drawing figures, the length of a conveyor can be easily adjusted and modified by adjusting the position of the cross supports 14 along the length of the side rails 12, as shown in FIG. 1. If the length of the conveyor frame assembly 10 is to be shortened, the user simply loosens the attachment clamps such that the cross supports 14 can be slid along the length of the side rails 12. If the side rails are to be shortened a significant amount, one or more of the cross supports could be eliminated.

After the cross supports have been removed, the length of the side rails 12 can be adjusted by cutting the desired portion of the side rail. Once the side rails have taken their final length, the cross supports are slid along the length of the side rails until they are in the desired position. Once in the desired position, the adjustment member is rotated to clamp the first and second ends of the cross support to the side rails in the manner previously described. In accordance with the present disclosure, the conveyor frame assembly can be easily modified and adjusted without the need for drilling any holes into the side frames or without requiring any additional components other than those already included in the cross supports.

This written description uses examples to disclose the invention, including the best mode, and also to enable any person skilled in the art to make and use the invention. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

I claim:

1. A modular conveyor assembly, comprising:
    a pair of spaced side rails each extending from a first end to a second end, wherein each of the side rails includes an interior side and an exterior side, the interior side including a pair of attachment lips;
    a plurality of cross supports each being a unitary member extending between the pair of side rails, each of the cross supports including a length extending between a first end and a second end, a support wall, a pair of receiving cavities, and a first surface, wherein the pair of receiving cavities are spaced from each other within the cross support and extend along the length of the cross support; and
    a pair of attachment clamps separately formed from and moveably mounted to each of the cross supports, each of the attachment clamps including a pair of attachment jaws joined by an adjustment member, wherein each of the attachment jaws is separate from the cross support and removably received in one of the receiving cavities and separated by the support wall, wherein each of the attachment jaws extends past one of the first and second ends of the cross support to engage the pair of attachment lips on one of the side rails.

2. The modular conveyor assembly of claim 1 wherein the first surface includes an open center slot.

3. The modular conveyor assembly of claim 1 wherein the adjustment member is operable to modify the distance between the pair of attachment jaws.

4. The modular conveyor assembly of claim 3 wherein the adjustment member includes a threaded shaft that is received in a threaded attachment opening in one of the attachment jaws.

5. The modular conveyor assembly of claim 4 wherein the pair of attachment jaws are arranged such that rotation of the adjustment member in a first direction moves the attachment jaws toward each other and rotation of the adjustment member in a second, opposite direction moves the attachment jaws away from each other.

6. The modular conveyor assembly of claim 4 wherein the adjustment member is accessible through the first surface of the cross support.

7. The modular conveyor assembly of claim 1 wherein the side rails each include a pair of attachment slots that extend along the length of the side rail from the first end to the second end, wherein each of the attachment slots receive one of the attachment jaws.

8. The modular conveyor assembly of claim 7 wherein each of the attachment slots is at least partially defined by one of the attachment lips.

9. The modular conveyor assembly of claim 1 wherein each of the attachment jaws includes an engagement end having an engagement surface, wherein the engagement surface engages one of the attachment lips.

10. The modular conveyor assembly of claim 9 wherein the engagement surface extends at an engagement angle relative to a vertical axis.

11. The modular conveyor assembly of claim 10 wherein the attachment jaws are spaced vertically from each other and wherein when the attachment jaws are moved vertically toward each other, the interaction between the engagement surfaces and the attachment lips move the side rail and the cross support toward each other.

12. A modular conveyor assembly, comprising:
a pair of spaced side rails each extending from a first end to a second end, wherein each of the side rails includes an interior side and an exterior side, the interior side including a pair of attachment lips;
a plurality of cross supports extending between the pair of side rails, each of the cross supports being a unitary member including a length extending between a first end and a second end, a support wall, a pair of receiving cavities, and a first surface, wherein the pair of receiving cavities are spaced from each other within the cross support and extend along the length of the cross support;
a pair of attachment jaws separately formed from and each removably received in one of the receiving cavities and separated by the support wall and extending from each of the first and second ends of the cross support, wherein each of the attachment jaws engage one of the pair of attachment lips on one of the side rails; and
an adjustment member coupled to the pair of attachment jaws, wherein the adjustment member is operable to modify the distance between the pair of attachment jaws to secure the cross support to the side rail.

13. The modular conveyor assembly of claim 12 wherein the first surface includes an open center slot.

14. The modular conveyor assembly of claim 12 wherein the location of the cross supports along the length of the side rails can be selectively adjusted by releasing the pair of attachment jaws and repositioning the cross supports in a desired location, wherein the cross supports can be re-secured to the side rails at the selected location through the adjustment member.

15. The modular conveyor assembly of claim 12 wherein the adjustment member includes a threaded shaft that is received in a threaded attachment opening in at least one of the attachment jaws.

16. The modular conveyor assembly of claim 15 wherein the attachment jaws are arranged such that rotation of the adjustment member in a first direction moves the pair of attachment jaws toward each other and rotation in a second, opposite direction moves the attachment jaws away from each other.

17. The modular conveyor assembly of claim 16 wherein each of the attachment jaws includes an engagement end having an engagement surface, wherein the engagement surface extends at an engagement angle relative to a vertical axis.

18. The modular conveyor assembly of claim 17 wherein the engagement angle is approximately 10°.

19. The modular conveyor assembly of claim 17 wherein the attachment jaws are spaced vertically from each other and wherein when the attachment jaws are moved vertically toward each other, the interaction between the engagement surfaces and the attachment lips move the side rail and the cross support toward each other.

* * * * *